United States Patent
Gershanovich et al.

(10) Patent No.: US 10,501,683 B2
(45) Date of Patent: Dec. 10, 2019

(54) PROPPANT

(71) Applicant: BASF SE, Ludwigshafen (DE)

(72) Inventors: Alexander Gershanovich, Beverly Hills, MI (US); Christopher M. Tanguay, Houston, TX (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/038,827

(22) PCT Filed: Nov. 25, 2014

(86) PCT No.: PCT/US2014/067342
§ 371 (c)(1),
(2) Date: May 24, 2016

(87) PCT Pub. No.: WO2015/081080
PCT Pub. Date: Jun. 4, 2015

(65) Prior Publication Data
US 2016/0376496 A1 Dec. 29, 2016

Related U.S. Application Data

(60) Provisional application No. 61/909,018, filed on Nov. 26, 2013.

(51) Int. Cl.
| | | |
|---|---|---|
| *C09K 8/80* | (2006.01) | |
| *C09K 8/66* | (2006.01) | |
| *C08G 18/65* | (2006.01) | |
| *C08G 18/69* | (2006.01) | |
| *C08G 18/76* | (2006.01) | |
| *C09D 175/14* | (2006.01) | |
| *C09K 8/68* | (2006.01) | |
| *C09K 8/88* | (2006.01) | |

(52) U.S. Cl.
CPC .......... *C09K 8/805* (2013.01); *C08G 18/6588* (2013.01); *C08G 18/69* (2013.01); *C08G 18/7657* (2013.01); *C09D 175/14* (2013.01); *C09K 8/66* (2013.01); *C09K 8/68* (2013.01); *C09K 8/885* (2013.01)

(58) Field of Classification Search
CPC . C09K 8/805; C09K 8/12; C09K 8/22; C09K 8/467; C09K 8/487; C09K 8/68; C09K 8/602; C09K 2208/10; C09K 8/58; C09K 8/66; C09K 8/88; C09K 8/885; C09K 2208/32; C09K 8/032; C09K 8/524; C09K 8/528; C09K 8/588; C09K 8/604; C09K 8/62; C09K 8/665; C09K 8/70; C09K 8/80; C09K 8/845; C09K 8/92; E21B 43/267; E21B 43/26
See application file for complete search history.

(56) References Cited

U.S. PATENT DOCUMENTS

| | | |
|---|---|---|
| 3,719,050 A | 3/1973 | Asao et al. |
| 3,954,629 A | 5/1976 | Scheffel et al. |
| 4,139,676 A | 2/1979 | Janssen et al. |
| 5,925,724 A | 7/1999 | Cenens et al. |
| 6,008,312 A | 12/1999 | Shirasaka |
| 7,727,940 B2 | 6/2010 | Reddy et al. |
| 7,900,702 B2 | 3/2011 | Reddy et al. |
| 2002/0048676 A1 | 4/2002 | McDaniel et al. |
| 2004/0048015 A1* | 3/2004 | Berger ............... C08G 18/69 428/35.3 |
| 2007/0277978 A1 | 12/2007 | Reddy et al. |
| 2008/0035337 A1 | 2/2008 | Reddy et al. |
| 2010/0282462 A1 | 11/2010 | Xu et al. |
| 2011/0053809 A1 | 3/2011 | Sanders et al. |
| 2011/0297383 A1 | 12/2011 | Tanguay et al. |
| 2012/0088699 A1 | 4/2012 | Qin |
| 2012/0177855 A1* | 7/2012 | Cavallin ........... C08F 283/008 428/35.7 |
| 2012/0279703 A1* | 11/2012 | McDaniel ............. C09K 8/805 166/280.1 |
| 2012/0283153 A1* | 11/2012 | McDaniel ............. C09K 8/805 507/219 |
| 2013/0065800 A1 | 3/2013 | McDaniel et al. |
| 2014/0196898 A1* | 7/2014 | Tanguay .............. C09K 8/70 166/280.2 |
| 2014/0345864 A1* | 11/2014 | Winter ................ C09K 8/62 166/280.2 |
| 2015/0119301 A1* | 4/2015 | McDaniel ............. C09K 8/805 507/224 |

FOREIGN PATENT DOCUMENTS

| | | |
|---|---|---|
| CN | 1191550 A | 8/1998 |
| CN | 101586024 A | 11/2009 |

(Continued)

OTHER PUBLICATIONS

Clay Valley Product Bulletin downloaded on Oct. 20, 2017.*

(Continued)

*Primary Examiner* — Kumar R Bhushan
(74) *Attorney, Agent, or Firm* — DLA Piper LLP (US)

(57) ABSTRACT

A proppant includes a particle present in an amount of from 90 to 99.5 percent by weight based on the total weight of the proppant, and a polyurethane coating disposed about the particle and present in an amount of from 0.5 to 10 percent by weight based on the total weight of the proppant. The polyurethane coating comprises the reaction product of an isocyanate component and an isocyanate-reactive component comprising a polydiene polyol.

10 Claims, No Drawings

(56) References Cited

FOREIGN PATENT DOCUMENTS

| | | | |
|---|---|---|---|
| CN | 102203211 A | | 9/2011 |
| CN | 102942334 A | | 2/2013 |
| CN | 102977320 A | | 3/2013 |
| EP | 201070862 A1 | | 2/2011 |
| RU | 2477235 C2 | | 3/2013 |
| RU | 2011149811 A1 | | 6/2013 |
| WO | WO 2007/141519 A2 | | 12/2007 |
| WO | WO2010/049467 | * | 5/2010 |
| WO | WO 2010/049467 A1 | | 5/2010 |
| WO | WO2012/151091 | * | 11/2012 |
| WO | WO 2013/049235 A1 | | 4/2013 |
| WO | WO2013/087844 | * | 6/2013 |
| WO | 2013/112251 A1 | | 8/2013 |

OTHER PUBLICATIONS

International Search Report for Application No. PCT/US2014/067342 dated Mar. 23, 2015, 3 pages.

Chao et al., "Progress in Chain Extender Evaluation for Polyurethanes Derived from Hydroxyl-Terminated Polybutadiene Resins", Cray Valley USA, LLC, Jan. 2010, pp. 1-7.

Cray Valley USA, LLC, "Krasol LBH-P 2000: Hydroxyl-Terminated Polybutadiene Technical Data Sheet", May 2010, 1 page.

Cray Valley USA, LLC, "Krasol LBH-P 3000: Hydroxyl-Terminated Polybutadiene Technical Data Sheet", May 2010, 1 page.

Cray Valley USA, LLC, "Krasol HLBH-P 2000: Hydrogenated Hydroxyl-Terminated Polyolefin Technical Data Sheet", May 2010, 1 page.

Cray Valley USA, LLC, "Krasol HLBH-P 3000: Hydrogenated Hydroxyl-Terminated Polyolefin Technical Data Sheet", May 2010, 1 page.

Cray Valley USA, LLC., "Product Bulletin: Hydroxyl-Terminated Polybutadiene Resins and Derivatives—Poly bd and Krasol", 2012, pp. 1-18.

Sartomer Company, Inc., "Krasol LBH-P 2000 Technical Data Sheet", Aug. 2003, 1 page.

Liu, Yijun, "Manual of Polyurethane Raw Materials and Adjuvants", 2nd Edition, Chemical Industry Press, Jan. 31, 2013, pp. 160-163.

\* cited by examiner

PROPPANT

CROSS-REFERENCE TO RELATED APPLICATIONS

This application is the National Stage of International Patent Application No. PCT/US2014/067342, filed on Nov. 25, 2014, which claims priority to and all the advantages of U.S. Provisional Patent Application No. 61/909,018, filed on Nov. 26, 2013, the content of which is incorporated herein by reference.

FIELD OF THE DISCLOSURE

The subject disclosure generally relates to a proppant and a method of forming the proppant. More specifically, the subject disclosure relates to a proppant which includes a particle and a polyurethane coating disposed on the particle, and which is used during hydraulic fracturing of a subterranean formation.

DESCRIPTION OF THE RELATED ART

Domestic energy needs currently outpace readily accessible energy resources, which has forced an increasing dependence on foreign petroleum fuels, such as oil and gas. At the same time, existing energy resources are significantly underutilized, in part due to inefficient oil and gas procurement methods and a deterioration in the quality of raw materials such as unrefined petroleum fuels.

Petroleum fuels are typically procured from subsurface reservoirs via a wellbore. Petroleum fuels are currently procured from low-permeability reservoirs through hydraulic fracturing of subterranean formations, such as bodies of rock having varying degrees of porosity and permeability. Hydraulic fracturing enhances production by creating fractures that emanate from the subsurface reservoir or wellbore, and provides increased flow channels for petroleum fuels. During hydraulic fracturing, specially-engineered carrier fluids are pumped at high pressure and velocity into the subsurface reservoir to cause fractures in the subterranean formations. A propping agent, i.e., a proppant, is mixed with the carrier fluids to keep the fractures open when hydraulic fracturing is complete. The proppant typically includes a particle and a coating disposed on the particle. The proppant remains in place in the fractures once the high pressure is removed, and thereby props open the fractures to enhance petroleum fuel flow into the wellbore. Consequently, the proppant increases procurement of petroleum fuel by creating a high-permeability, supported channel through which the petroleum fuel can flow.

However, many existing proppants exhibit inadequate thermal stability for high temperature and pressure applications, e.g. wellbores and subsurface reservoirs having temperatures greater than about 21.1° C. (70° F.) and pressures, i.e., closure stresses, greater than about 51.7 MPa (7,500 psi). As an example of a high temperature application, certain wellbores and subsurface reservoirs throughout the world have temperatures of about 190.6° C. (375° F.) and about 282.2° C. (540° F.). As an example of a high pressure application, certain wellbores and subsurface reservoirs throughout the world have closure stresses that exceed about 82.7 MPa (12,000 psi) or even about 96.5 MPa (14,000 psi). As such, many existing proppants, which include coatings, have coatings such as epoxy or phenolic coatings, which melt, degrade, and/or shear off the particle in an uncontrolled manner when exposed to such high temperatures and pressures.

Further, many existing proppants include coatings having inadequate crush resistance. That is, many existing proppants include non-uniform coatings that include defects, such as gaps or indentations, which contribute to premature breakdown and/or failure of the coating. Since the coating typically provides a cushioning effect for the proppant and evenly distributes high pressures around the proppant, premature breakdown and/or failure of the coating undermines the crush resistance of the proppant. Crushed proppants cannot effectively prop open fractures and often contribute to impurities in unrefined petroleum fuels in the form of dust particles.

Moreover, many existing proppants also exhibit unpredictable consolidation patterns and suffer from inadequate permeability in wellbores, i.e., the extent to which the proppant allows the flow of petroleum fuels. That is, many existing proppants have a lower permeability and impede petroleum fuel flow. Further, many existing proppants consolidate into aggregated, near-solid, non-permeable proppant packs and prevent adequate flow and procurement of petroleum fuels from subsurface reservoirs.

Also, many existing proppants are not compatible with low-viscosity carrier fluids having viscosities of less than about 3,000 cps at 80° C. Low-viscosity carrier fluids are typically pumped into wellbores at higher pressures than high-viscosity carrier fluids to ensure proper fracturing of the subterranean formation. Consequently, many existing coatings fail mechanically, i.e., shear off the particle, when exposed to high pressures or react chemically with low-viscosity carrier fluids and degrade. For example, many existing proppants, especially proppants comprising polyurethane, do not exhibit adequate hydrolytic stability and tend to decompose or breakdown when exposed to water, a typical carrier fluid, especially at elevated temperatures and pressures.

Finally, many existing proppants are coated via noneconomical coating processes and therefore contribute to increased production costs. That is, many existing proppants require multiple layers of coatings, which results in time-consuming and expensive coating processes.

Due to the inadequacies of existing proppants, there remains an opportunity to provide an improved proppant.

SUMMARY OF THE DISCLOSURE AND ADVANTAGES

The subject disclosure provides a proppant for hydraulically fracturing a subterranean formation. The proppant includes a particle present in an amount of from about 90 to 99.5 percent by weight based on the total weight of the proppant, and a polyurethane coating disposed about the particle and present in an amount of from about 0.5 to 10 percent by weight based on the total weight of the proppant. The polyurethane coating comprises the reaction product of an isocyanate component and an isocyanate-reactive component comprising a polydiene polyol.

The polyurethane coating of the proppant of the subject disclosure can be formed efficiently, e.g. on-site at the well bore, at ambient temperatures, in a minimal amount of time, etc. In addition, the polyurethane coating is hydrolytically stable due to the polydiene polyol. As such, the polyurethane coating of the subject disclosure exhibits excellent properties when used in hydraulic fracturing compositions comprising water.

DETAILED DESCRIPTION OF THE DISCLOSURE

The subject disclosure includes a proppant, a method of forming, or preparing, the proppant, a method of hydraulically fracturing a subterranean formation, and a method of filtering a fluid. The proppant is typically used, in conjunction with a carrier fluid, to hydraulically fracture the subterranean formation which defines a subsurface reservoir (e.g. a wellbore or reservoir itself). Here, the proppant props open the fractures in the subterranean formation after the hydraulic fracturing. In one embodiment, the proppant may also be used to filter unrefined petroleum fuels, e.g. crude oil, in fractures to improve feedstock quality for refineries. However, it is to be appreciated that the proppant of the subject disclosure can also have applications beyond hydraulic fracturing and crude oil filtration, including, but not limited to, water filtration and artificial turf.

The proppant includes a particle and a polyurethane coating disposed on the particle. As used herein, the terminology "disposed on" encompasses the polyurethane coating being disposed about the particle and also encompasses both partial and complete covering of the particle by the polyurethane coating. The polyurethane coating is disposed on the particle to an extent sufficient to change the properties of the particle, e.g. to form a particle having a polyurethane coating thereon which can be effectively used as a proppant. As such, any given sample of the proppant typically includes particles having the polyurethane coating disposed thereon, and the polyurethane coating is typically disposed on a large enough surface area of each individual particle so that the sample of the proppant can effectively prop open fractures in the subterranean formation during and after the hydraulic fracturing, filter crude oil, etc. The polyurethane coating is described additionally below.

Although the particle may be of any size, the particle typically has a particle size distribution of from about 10 to 100 mesh, alternatively from about 20 to 70 mesh, as measured in accordance with standard sizing techniques using the United States Sieve Series. That is, the particle typically has a particle size of from about 149 to 2,000, alternatively from about 210 to 841, μm. Particles having such particle sizes allow less polyurethane coating to be used, allow the polyurethane coating to be applied to the particle at a lower viscosity, and allow the polyurethane coating to be disposed on the particle with increased uniformity and completeness as compared to particles having other particle sizes.

Although the shape of the particle is not critical, particles having a spherical shape typically impart a smaller increase in viscosity to a hydraulic fracturing composition than particles having other shapes, as set forth in more detail below. The hydraulic fracturing composition is a mixture comprising the carrier fluid and the proppant. Typically, the particle is either round or roughly spherical.

The particle is present in the proppant in an amount of from about 90 to 99.5, alternatively from about 94 to 99.3, alternatively from about 96 to 99, percent by weight based on the total weight of the proppant. The amount of particle present in the proppant may vary outside of the ranges above, but is typically both whole and fractional values within these ranges.

The particle typically contains less than about 1 percent by weight of moisture, based on the total weight of the particle. Particles containing higher than about 1 percent by weight of moisture typically interfere with sizing techniques and prevent uniform coating of the particle.

Suitable particles for purposes of the subject disclosure include any known particle for use during hydraulic fracturing, water filtration, or artificial turf preparation. Non-limiting examples of suitable particles include minerals, ceramics such as sintered ceramic particles, sands, nut shells, gravels, mine tailings, coal ashes, rocks (such as bauxite), smelter slag, diatomaceous earth, crushed charcoals, micas, sawdust, wood chips, resinous particles, polymeric particles, and combinations thereof. It is to be appreciated that other particles not recited herein may also be suitable for the purposes of the subject disclosure.

Sand is a preferred particle and when applied in this technology is commonly referred to as frac, or fracturing, sand. Examples of suitable sands include, but are not limited to, Badger sand, Brady sand, Northern White sand, Texas Hickory sand, and Ottawa sand. Based on cost and availability, inorganic materials such as sand and sintered ceramic particles are typically favored for applications not requiring filtration.

A specific example of a sand that is suitable as a particle for the purposes of the subject disclosure is Ottawa sand, commercially available from U.S. Silica Company of Berkeley Springs, W. Va. Yet another specific example of a sand that is suitable as a particle for the purposes of this disclosure is Wisconsin sand, commercially available from Badger Mining Corporation of Berlin, Wis. Particularly preferred sands for application in this disclosure are Ottawa and Wisconsin sands. Ottawa and Wisconsin sands of various sizes, such as 30/50, 20/40, 40/70, and 70/140 can be used.

Specific examples of suitable sintered ceramic particles include, but are not limited to, aluminum oxide, silica, bauxite, and combinations thereof. The sintered ceramic particle may also include clay-like binders.

An active agent may also be included in the particle. In this context, suitable active agents include, but are not limited to, organic compounds, microorganisms, and catalysts. Specific examples of microorganisms include, but are not limited to, anaerobic microorganisms, aerobic microorganisms, and combinations thereof. A suitable microorganism for the purposes of the subject disclosure is commercially available from LUCA Technologies of Golden, Colo. Specific examples of suitable catalysts include fluid catalytic cracking catalysts, hydroprocessing catalysts, and combinations thereof. Fluid catalytic cracking catalysts are typically selected for applications requiring petroleum gas and/or gasoline production from crude oil. Hydroprocessing catalysts are typically selected for applications requiring gasoline and/or kerosene production from crude oil. It is also to be appreciated that other catalysts, organic or inorganic, not recited herein may also be suitable for the purposes of the subject disclosure.

Such additional active agents are typically favored for applications requiring filtration. As one example, sands and sintered ceramic particles are typically useful as a particle for support and propping open fractures in the subterranean formation which defines the subsurface reservoir, and, as an active agent, microorganisms and catalysts are typically useful for removing impurities from crude oil or water. Therefore, a combination of sands/sintered ceramic particles and microorganisms/catalysts as active agents are particularly preferred for crude oil or water filtration.

Suitable particles for purposes of the present disclosure may even be formed from resins and polymers. Specific examples of resins and polymers for the particle include, but are not limited to, polyurethanes, polycarbodiimides, polyureas, acrylates, polyvinylpyrrolidones, acrrylonitrile-butadiene styrenes, polystyrenes, polyvinyl chlorides, fluoroplastics, polysulfides, nylon, polyamide imides, and combinations thereof.

As indicated above, the proppant includes the polyurethane coating disposed on the particle. The polyurethane coating is selected based on the desired properties and expected operating conditions of the proppant. The polyurethane coating may provide the particle with protection from operating temperatures and pressures in the subterranean formation and/or subsurface reservoir. Further, the polyurethane coating may protect the particle against closure stresses exerted by the subterranean formation. The polyurethane coating may also protect the particle from ambient conditions and minimizes disintegration and/or dusting of the particle. In some embodiments, the polyurethane coating may also provide the proppant with desired chemical reactivity and/or filtration capability.

The instant disclosure describes a polyurethane system for forming the polyurethane coating comprising the isocyanate component and the isocyanate-reactive component. Typically, the system is provided in two or more discrete components, such as the isocyanate component and the isocyanate-reactive (or resin) component, i.e., as a two-component (or 2K) system, which is described further below. It is to be appreciated that reference to the isocyanate component and the isocyanate-reactive component, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other.

Of course, the polyurethane coating comprises the reaction product of the isocyanate component and the isocyanate-reactive component. The isocyanate component may include aliphatic isocyanates, aromatic, polymeric isocyanates, or combinations thereof. The isocyanate component typically includes more than one different isocyanate, e.g., polymeric diphenylmethane diisocyanate and 4,4'-diphenylmethane diisocyanate. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate pre-polymer. The isocyanate pre-polymer is typically a reaction product of an isocyanate and a polyol and/or a polyamine. The isocyanate used in the pre-polymer can be any isocyanate as described above. The polyol used to form the pre-polymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the pre-polymer is typically selected from the group of ethylene diamine, toluene diamine, diaminodiphenylmethane and polymethylene polyphenylene polyamines, aminoalcohols, and combinations thereof. Examples of suitable amino alcohols include ethanolamine, diethanolamine, triethanolamine, and combinations thereof.

Specific isocyanates that may be included in the isocyanate composition and may be used to prepare the polyurethane coating include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2, 4,6-triisocyanate; 1-ethyl-3,5-diisopropyl benzene-2,4,6-triisocyanate and 1,3,5-triisopropyl benzene-2,4,6-triisocyanate. Other suitable polyurethane coatings can also be prepared from aromatic diisocyanates or isocyanates having one or two aryl, alkyl, arakyl or alkoxy substituents wherein at least one of these substituents has at least two carbon atoms.

The isocyanate component typically has an NCO content of from about 20 to 45, alternatively from about 25 to 35, weight percent when tested in accordance with DIN EN ISO 11909, and a viscosity at 25° C. of from about 5 to 800, alternatively from about 10 to 400, alternatively from about 15 to 250, alternatively from about 180 to 220, mPa·sec when tested in accordance with DIN EN ISO 3219.

Suitable isocyanates are commercially available from BASF Corporation of Florham Park, N.J. under the trade name LUPRANATE®.

In various embodiments the isocyanate component comprises monomeric and polymeric isocyanate. For example, in one embodiment the isocyanate component comprises polymeric diphenylmethane diisocyanate and 4,4'-diphenylmethane diisocyanate, and has an NCO content of about 33.5 weight percent.

The isocyanate component is typically reacted to form the polyurethane coating in an amount of from about 10 to 90, alternatively from about 20 to 75, alternatively from about 30 to 60, percent by weight based on the total weight of all components used to form the polyurethane coating. Of course, the amount of the isocyanate component reacted to form the polyurethane coating may vary outside of the ranges above, but is typically both whole and fractional values within these ranges. Further, it is to be appreciated that more than one isocyanate may be included in the isocyanate component, in which case the total amount of all isocyanates included is within the above ranges.

The isocyanate-reactive component comprises a polyol, which reacts with the isocyanate component. Specifically, the isocyanate-reactive component comprises a polyolefin polyol. In one embodiment the polyolefin polyol is a polydiene polyol. Of course, the isocyanate-reactive component typically includes a polydiene polyol and may include additional polyols, i.e., one or more supplemental polyols. For purposes of the subject disclosure, the term "polyol" is used to describe a molecule that includes one or more hydroxyl functional groups, typically at least two hydroxyl functional groups and have a number average molecular weight of greater than 400 g/mol.

The isocyanate-reactive component comprises a polyolefin polyol. The polyolefin polyol typically has a nominal functionality of greater than about 1.5, alternatively from about 1.5 to 5, alternatively from about 1.6 to 3, alternatively from about 1.9 to 3, alternatively about 2. In one embodiment, the polyolefin polyol is hydroxyl-terminated.

The polyolefin polyol typically has a number average molecular weight of from about 400 to 15,000, alternatively from about 400 to 11,000, alternatively from about 400 to 7,000, alternatively from about 400 to 3,000, alternatively from about 400 to 2,500, alternatively from about 750 to 2,300, alternatively from about 1,000 to 2,200, g/mol, and a viscosity at 25° C. of from about 5 to 200, alternatively from about 5 to 100, alternatively from about 10 to 90, Pa·sec at 25° C. when tested in accordance with DIN EN ISO 3219.

The polyolefin polyol is typically present in the isocyanate-reactive component in an amount of from greater than about 0 and less than about 95 percent by weight based on the total weight of said isocyanate-reactive component, alternatively from about 10 to 95, alternatively from about 30 to 90, alternatively from about 50 to 90, alternatively from about 60 to 90, alternatively from about 60 to 80, percent by weight based on the total weight of the isocyanate-reactive component. The amount of polyolefin polyol may vary outside of the ranges above, but is typically both whole and fractional values within these ranges. Further, it is to be appreciated that more than one polyolefin polyol may be included in the isocyanate-reactive component, in which case the total amount of all polyolefin polyol included is within the above ranges.

Suitable polyolefin polyols are commercially available from TOTAL of Houston, Tex. under the trade name KRASOL®.

In one embodiment, the polyolefin polyol is a polydiene polyol. The polydiene polyol comprises polymerized diene units. For purposes of the subject disclosure, the term "diene units" is used to describe units within a polymer which were formed from a diene or diolefin, i.e., a hydrocarbon having two carbon-carbon double bonds. Examples of dienes which can be used to from the polydiene include, but are not limited to, 1,2-propadiene, isoprene, and 1,3-butadiene.

In one embodiment, the polydiene polyol is a polybutadiene polyol, i.e., is formed from 1,3-butadiene and thus comprises butadiene units. Of course, 1,3-butadiene can polymerize to form 1,4-cis units, 1,4-trans units, and 1,2-vinyl units. The polybutadiene polyol typically includes, no less than about 5, alternatively no less than about 25, alternatively no less than about 50, alternatively no less than about 55, alternatively no less than about 60, alternatively no less than about 65, percent by weight 1,2-vinyl units based the total weight of the polybutadiene polyol. It is believed that the structure of the polybutadiene polyol imparts hydrolytic stability to the polyurethane coating which is formed therefrom.

The polydiene polyol typically has a nominal functionality of greater than about 2, alternatively from about 2 to 5, alternatively from about 2 to 3, alternatively about 2. In one embodiment, the polydiene polyol is hydroxyl-terminated. In another embodiment, the polydiene polyol is a hydroxyl-terminated polybutadiene, i.e., is a linear polybutadiene having two primary hydroxyl functional groups.

The polydiene polyol typically has a lower molecular weight. Specifically, the polydiene polyol typically has a number average molecular weight of from about 400 to 15,000, alternatively from about 400 to 11,000, alternatively from about 400 to 7,000, alternatively from about 400 to 3,000, alternatively from about 400 to 2,500, alternatively from about 750 to 2,300, alternatively from about 1,000 to 2,200, g/mol, and a viscosity at 25° C. of from about 5 to 3,200, alternatively from about 10 to 1,600, alternatively from about 10 to 800, alternatively from about 10 to 100, alternatively from about 15 to 70, Pa·sec at 25° C. when tested in accordance with DIN EN ISO 3219.

Suitable polydiene polyols are commercially available from TOTAL of Houston, Tex. under the trade name KRASOL®.

In one embodiment, the polydiene polyol is a linear, hydroxyl-terminated polybutadiene having about 65 percent by weight 1,2-vinyl units, about 12.5 percent by weight 1,4-cis units, about 22.5 percent by weight 1,4-trans units, a molecular weight of about 2000 g/mol, and a viscosity of about 13 Pa·sec at 25° C. In this embodiment the hydroxyl-terminated polybutadiene has a hydroxyl value of about 0.91 meq/g. Because of the high concentration of 1,2-vinyl units, i.e., olefinic double bonds, and low molecular weight, the hydroxyl-terminated polybutadiene of this embodiment is a liquid at room temperature and thus wets out the particle well to facilitate formation of a consistent and uniform polyurethane coating about the particle. Further, it is believed that the lack of oxygen atoms in the polymer chain of the polybutadiene polyol imparts hydrolytic stability to the polyurethane coating which is formed therefrom.

In another embodiment, the polydiene polyol is a linear, hydroxyl-terminated polybutadiene having about 65 percent by weight 1,2-vinyl units, about 12.5 percent by weight 1,4-cis units, about 22.5 percent by weight 1,4-trans units, a molecular weight of about 3000 to 3200 g/mol, and a viscosity of about 20 Pa·sec at 25° C. In this embodiment the hydroxyl-terminated polybutadiene has a hydroxyl value of about 0.64 meq/g. Because of the high concentration of 1,2-vinyl units, i.e., olefinic double bonds, and low molecular weight, the hydroxyl-terminated polybutadiene of this embodiment is a liquid at room temperature and thus wets out the particle well to facilitate formation of a consistent and uniform polyurethane coating about the particle. Further, it is believed that the lack of oxygen atoms in the polymer chain of the polybutadiene polyol imparts hydrolytic stability to the polyurethane coating which is formed therefrom.

In one embodiment, the polyolefin polyol is a hydrogenated, linear, hydroxyl-terminated polydiene polyol having a hydrogenation extent of greater than 97%, a molecular weight of about 2000 g/mol, and a viscosity of about 36 Pa·sec at 25° C. In this embodiment the hydrogenated, linear, hydroxyl-terminated polydiene polyol has a hydroxyl value of about 0.83 meq/g. It is believed that the olefinic structure and the lack of oxygen atoms in the polymer chain of the hydrogenated polybutadiene polyol imparts hydrolytic stability to the polyurethane coating which is formed therefrom.

In another embodiment, the polyolefin polyol is a hydrogenated, linear, hydroxyl-terminated polydiene polyol having hydrogenation extent of greater than 98%, a molecular weight of about 3000 to 3200 g/mol, and a viscosity of about 65 Pa·sec at 25° C. In this embodiment the hydrogenated, linear, hydroxyl-terminated polydiene polyol has a hydroxyl value of about 0.56 meq/g. It is believed that the olefinic structure and the lack of oxygen atoms in the polymer chain of the hydrogenated polybutadiene polyol imparts hydrolytic stability to the polyurethane coating which is formed therefrom.

If present, the polydiene polyol is typically present in the isocyanate-reactive component in an amount of from greater than about 0 and less than about 95 percent by weight based on the total weight of said isocyanate-reactive component, alternatively from about 10 to 95, alternatively from about 30 to 90, alternatively from about 50 to 90, alternatively from about 60 to 90, alternatively from about 60 to 80, percent by weight based on the total weight of the isocyanate-reactive component. The amount of polydiene polyol may vary outside of the ranges above, but is typically both whole and fractional values within these ranges. Further, it is to be appreciated that more than one polydiene polyol may be included in the isocyanate-reactive component, in which case the total amount of all polydiene polyol included is within the above ranges.

In addition to the polydiene polyol, the isocyanate-reactive component can also include one or more supplemental polyols. If included, the supplemental polyol is typically selected from the group of conventional polyols which are not polydiene polyols, such as polyether polyols, polyester polyols, polyether/ester polyols, and combinations thereof. In one embodiment, the isocyanate-reactive component may also comprise a polyether polyol having a higher functionality, e.g. greater than about 3. It is believed that use of polyether polyols having higher functionality may help improve the hydrolytic resistance of the polyurethane coating. Further, use polyether polyols having a higher functionality increases the crosslinking density of the polyurethane coating formed therefrom which makes the polyurethane coating harder and less flexible.

The supplemental polyol is typically included in the isocyanate-reactive component in an amount of from about 1 to 70, alternatively from about 5 to 50, alternatively about 5 to 25, percent by weight based on the total weight of all components included in the isocyanate-reactive component. The amount of supplemental polyol may vary outside of the ranges above, but is typically both whole and fractional values within these ranges. Further, it is to be appreciated that more than one supplemental polyol may be included in the isocyanate-reactive component, in which case the total amount of all supplemental polyol included is within the above ranges.

The isocyanate-reactive component may include one or more chain extenders. The chain extender has at least two hydroxyl functional groups and a number average molecular weight of no more than 400 g/mol. Specifically, the chain extender typically has a nominal functionality no greater than about 4, alternatively no greater than about 3, alternatively no greater than about 2.5, alternatively from about 1.9 to 3.1, alternatively from about 1.9 to 2.5, and a number average molecular weight of from about 50 to 400, alternatively from about 60 to 300, alternatively from about 62 to 250, alternatively from about 70 to 250, alternatively from about 75 to 195, alternatively about 192, alternatively about 134, alternatively about 76. As such, the chain extender can be referred to in the art as a "short" chain extender.

Non-limiting examples of such chain extenders include, but are not limited to, straight chain glycols having from about 2 to 20 carbon atoms in the main chain, diols having an aromatic ring and having up to about 20 carbon atoms, and even triols such as those set forth below. Examples of suitable chain extenders, for purposes of the present disclosure, include propylene glycol, dipropylene glycol, tripropylene glycol, diethylene glycol, 1,3-propanediol, 1,4-butanediol, 1,5-pentanediol, 1,6-hexanediol, 2-butene-1,4-diol, thoidiethanol, butyleneglycol, 1,4-bis (hydroxyethoxy) benzene, p-xylene glycol and hydrogenated products thereof, trimethylol, stearyl alcohol, and hydroxyethyl acrylate. In one embodiment, the chain extender typically comprises an alkylene glycol. In one specific embodiment, the alkylene glycol is selected from the group of propylene glycol, dipropylene glycol, tripropylene glycol, and combinations thereof. In another embodiment, the chain extender is tripropylene glycol. It is believed that the chain extender imparts increased hydrolytic resistance, as well as increased strength, tear strength, and hardness to the polyurethane coating as a result of its lower molecular weight and its molecular structure, e.g., ether groups.

In one embodiment, the isocyanate-reactive component consists essentially of the chain extender comprising an alkylene glycol and the polydienene polyol. In this embodiment, the weight ratio of chain extender to polydiene polyol is typically greater than 2, i.e., there is at least 2 times an amount by weight of polydiene polyol in the isocyanate-reactive component as there is an amount by weight of chain extender in the isocyanate-reactive component. In another embodiment, the isocyanate-reactive component consists essentially of the chain extender comprising an alkylene glycol, the polydienene polyol, and a polyether supplemental polyol.

If included, the chain extender is typically included in the isocyanate-reactive component in an amount of from about 1 to 50, alternatively from about 5 to 50, alternatively from about 10 to 40, alternatively from about 20 to 40, percent by weight based on the total weight of all components included in the isocyanate-reactive component. The amount of chain extender may vary outside of the ranges above, but is typically both whole and fractional values within these ranges. Further, it is to be appreciated that more than one chain extender may be included in the isocyanate-reactive component, in which case the total amount of all chain extender included is within the above ranges.

The isocyanate-reactive component also typically comprises one or more catalysts. The catalyst is typically present in the isocyanate-reactive component to catalyze the reaction between the isocyanate component and the isocyanate-reactive component. That is, isocyanate-reactive component typically includes a "polyurethane catalyst" which catalyzes the reaction between an isocyanate and a hydroxy functional group. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc.

The isocyanate-reactive component can also include a "polycarbodiimide catalyst", i.e., a catalyst which catalyzes the reaction between two isocyanate functional groups. For example, the isocyanate-reactive component can include phospholene oxide catalyst. Suitable, non limiting examples of phospholene oxides include phospholene oxides such as 3-methyl-1-phenyl-2-phospholene oxide (MPPO), 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO). Two particularly suitable phospholene oxides are MPPO and MEPO.

The isocyanate-reactive component can also include a "curing agent", i.e., a crosslinker that crosslinks the carbon-carbon double bonds of the polydiene polyol. Examples of curing agents include, but are not limited to, organic peroxides, sulfur, and organic sulfur-containing compounds. Non-limiting examples of organic peroxides include dicumyl peroxide and t-butylperoxyisopropyl benzene. Non-limiting examples of organic sulfur-containing compounds include thiuram based vulcanization promoters such as tetramethylthiuram disulfide (TMTD), tetraethylthiuram disulfide (TETD), and dipentamethylenethiuram tetrasulfide (DPTT), 4,4'-dithiomorpholine.

The isocyanate-reactive component can also include an antistatic component. The antistatic component includes one or more antistatic compounds or antistats. The antistat reduces, removes, and prevents the buildup of static electricity on the proppant. The antistat can be a non-ionic antistat or an ionic or amphoteric antistat (which can be further classified as anionic or cationic). Ionic antistats are compounds that include at least one ion, i.e., an atom or molecule in which the total number of electrons is not equal to the total number of protons, giving it a net positive or negative electrical charge. Non-ionic antistats are organic compounds composed of both a hydrophilic and a hydrophobic portion. Of course, the antistatic component can include a combination of ionic and non-ionic antistats.

One suitable antistatic component is a quaternary ammonium compound. The quaternary ammonium compound includes a quaternary ammonium cation, often referred to as a quat. Quats are positively charged polyatomic ions of the structure $NR_4+$, R being an alkyl group or an aryl group. Unlike the ammonium ion ($NH_4+$) and the primary, secondary, or tertiary ammonium cations, quats are permanently charged, independent of the pH of their solution.

One such quaternary ammonium compound is dicocoyl ethyl hydroxyethylmonium methosulfate. Dicocoyl ethyl hydroxyethylmonium methosulfate is the reaction product of triethanol amine, fatty acids, and methosulfate.

Notably, dicocoyl ethyl hydroxyethylmonium methosulfate is a cationic antistat having a cationic-active matter content of about 74 to 79 percent when tested in accordance with International Organization for Standardization ("ISO") 2871-1:2010. ISO 2871 specifies a method for the determination of the cationic-active matter content of high-molecular-mass cationic-active materials such as quaternary ammonium compounds in which two of the alkyl groups each contain 10 or more carbon atoms, e.g. distearyl-dimethyl-ammonium chlorides, or salts of imidazoline or 3-methylimidazoline in which long-chain acylaminoethyl and alkyl groups are substituted in the 1- and 2-positions, respectively.

Dicocoyl ethyl hydroxyethylmonium methosulfate has an acid value of not greater than 12 when tested in accordance with ISO 4314-1977 (Surface active agents—Determination of free alkalinity or free acidity—Titrimetric method) and a pH of from 2.5 to 3 when tested in accordance with ISO 4316:1977 (Determination of pH of aqueous solutions—Potentiometric method).

The quaternary ammonium compound can be included in the isocyanate-reactive component or applied to the proppant in an amount of from about 50 to 1000, alternatively from about 100 to 500, PPM (PPM by weight particle, i.e., 100 grams of particle×200 PPM surface treatment equals 0.02 grams of surface treatment per 100 grams of particle. The amount of the quaternary ammonium compound present in the surface treatment may vary outside of the ranges above, but is typically both whole and fractional values within these ranges.

The isocyanate-reactive component can also include a silicon-containing adhesion promoter. This silicon-containing adhesion promoter is also commonly referred to in the art as a coupling agent or as a binder agent. The silicon-containing adhesion promoter binds the polyurethane coating to the particle. More specifically, the silicon-containing adhesion promoter typically has organofunctional silane groups to improve adhesion of the polyurethane coating to the particle. Without being bound by theory, it is thought that the silicon-containing adhesion promoter allows for covalent bonding between the particle and the polyurethane coating. In one embodiment, the surface of the particle is activated with the silicon-containing adhesion promoter by applying the silicon-containing adhesion promoter to the particle prior to coating the particle with the reaction mixture/polyurethane coating. In this embodiment, the silicon-containing adhesion promoter can be applied to the particle by a wide variety of application techniques including, but not limited to, spraying, dipping the particles in the polyurethane coating, etc. In another embodiment, the silicon-containing adhesion promoter may be added to the isocyanate-reactive component. As such, the particle is then simply exposed to the silicon-containing adhesion promoter when the polyurethane coating is applied to the particle. The silicon-containing adhesion promoter is useful for applications requiring excellent adhesion of the polyurethane coating to the particle, for example, in applications where the proppant is subjected to shear forces in an aqueous environment. Use of the silicon-containing adhesion promoter provides adhesion of the polyurethane coating to the particle such that the polyurethane coating will remain adhered to the surface of the particle even if the proppant, including the polyurethane coating, the particle, or both, fractures due to closure stress.

Examples of suitable adhesion promoters, which are silicon-containing, include, but are not limited to, glycidoxypropyltrimethoxysilane, aminoethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

Specific examples of suitable silicon-containing adhesion promoters include, but are not limited to, SILQUEST™ A1100, SILQUEST™ A1110, SILQUEST™ A1120, SILQUEST™ 1130, SILQUEST™ A1170, SILQUEST™ A-189, and SILQUEST™ Y9669, all commercially available from Momentive Performance Materials of Albany, N.Y. A particularly suitable silicon-containing adhesion promoter is SILQUEST™ A1100, i.e., gamma-aminopropyltriethoxysilane. The silicon-containing adhesion promoter may be present in the proppant in an amount of from about 0.001 to 5, alternatively from about 0.01 to 2, alternatively from about 0.02 to 1.25, percent by weight based on the total weight of the proppant. The amount of silicon-containing adhesion promoter present in the proppant may vary outside of the ranges above, but is typically both whole and fractional values within these ranges.

The isocyanate-reactive component can also include a wetting agent. The wetting agent is also commonly referred to in the art as a surfactant. The proppant may include more than one wetting agent. The wetting agent may include any suitable wetting agent or mixtures of wetting agents known in the art. The wetting agent is employed to increase a surface area contact between the polyurethane coating and the particle. In a typical embodiment, the wetting agent is included in the isocyanate-reactive component. In another embodiment, the surface of the particle is activated with the wetting agent by applying the wetting agent to the particle prior to coating the particle with the polyurethane coating.

A suitable wetting agent is BYK® 310, a polyester modified poly-dimethyl-siloxane, commercially available from BYK Additives and Instruments of Wallingford, Conn. The wetting agent may be present in the proppant in an amount of from about 0.01 to 10, alternatively from about 0.02 to 5, alternatively from about 0.02 to 0.04, percent by weight based on the total weight of the proppant. The amount of wetting agent present in the proppant may vary outside of the ranges above, but is typically both whole and fractional values within these ranges.

The isocyanate-reactive component may also include the active agent already described above in the context of the particle. In other words, the active agent may be included in the polyurethane coating independent of the particle. Once again, suitable active agents include, but are not limited to organic compounds, microorganisms, catalysts, and salts. Suitable non-limiting examples of salts include sodium perboate and sodium persulfate.

The isocyanate-reactive component may also include various additives. Suitable additives include, but are not limited to, blowing agents, blocking agents, dyes, pigments, diluents, catalysts, solvents, specialized functional additives such as antioxidants, ultraviolet stabilizers, biocides, fire retardants, fragrances, and combinations thereof.

For example, a pigment additive allows the polyurethane coating to be visually evaluated for thickness and integrity and can provide various marketing advantages.

As another example, physical blowing agents and chemical blowing agents are typically selected for polyurethane coatings requiring foaming. That is, in one embodiment, the coating may include a foam coating disposed on the particle. Again, it is to be understood that the terminology "disposed on" encompasses both partial and complete covering of the particle by the polyurethane coating, a foam coating in this instance. The foam coating is typically useful for applications requiring enhanced contact between the proppant and crude oil. That is, the foam coating typically defines microchannels and increases a surface area for contact between crude oil and the catalyst and/or microorganism.

As set forth above, the polyurethane coating is formed from the isocyanate-reactive component. Once formed, the polyurethane coating is chemically and physically stable over a range of temperatures and does not typically melt, degrade, and/or shear off the particle in an uncontrolled manner when exposed to higher pressures and temperatures, e.g. pressures and temperatures greater than pressures and temperatures typically found on the earth's surface. As one example, the polyurethane coating is particularly applicable when the proppant is exposed to significant pressure, compression and/or shear forces, and temperatures exceeding 200° C. (392° F.) in the subterranean formation and/or subsurface reservoir defined by the formation. The polyurethane coating is generally viscous to solid nature, and depending on molecular weight.

The polyurethane coating is present in the proppant in an amount of from about 0.5 to 10, alternatively from about 0.7 to 6, alternatively from about 1 to 4, percent by weight based on the total weight of the proppant. The amount of polyurethane coating present in the proppant may vary outside of the ranges above, but is typically both whole and fractional values within these ranges.

The polyurethane coating may be formed in-situ where the polyurethane coating is disposed on the particle during formation of the polyurethane coating. Typically the components of the polyurethane coating are combined with the particle and the polyurethane coating is disposed on the particle.

The polyurethane coating may exhibit excellent non-wettability in the presence of water, as measured in accordance with standard contact angle measurement methods known in the art. The polyurethane coating may have a contact angle of greater than 90° and may be categorized as hydrophobic. Consequently, the proppant of such an embodiment can partially float in the subsurface reservoir and is typically useful for applications requiring foam coatings.

Further, the polyurethane coating typically exhibits excellent hydrolytic resistance and will not lose strength and durability when exposed to water. Consequently, the proppant can be submerged in the subsurface reservoir and exposed to water and will maintain its strength and durability.

The polyurethane coating can be cured/cross-linked prior to pumping of the proppant into the subsurface reservoir, or the polyurethane coating can be curable/cross-linkable whereby the polyurethane coating cures in the subsurface reservoir due to the conditions inherent therein. These concepts are described further below.

The proppant of the subject disclosure may include the particle encapsulated with a cured polyurethane coating. The polyurethane coating typically provides crush strength, or resistance, for the proppant and prevents agglomeration of the proppant. Since the cured polyurethane coating is cured before the proppant is pumped into a subsurface reservoir, the proppant typically does not crush or agglomerate even under high pressure and temperature conditions.

Alternatively, the proppant of the subject disclosure may include the particle encapsulated with a curable polyurethane coating. The curable polyurethane coating typically consolidates and cures subsurface. The curable polyurethane coating is typically not cross-linked, i.e., cured, or is partially cross-linked before the proppant is pumped into the subsurface reservoir. Instead, the curable polyurethane coating typically cures under the high pressure and temperature conditions in the subsurface reservoir. Proppants comprising the particle encapsulated with the curable polyurethane coating are often used for high pressure and temperature conditions.

Additionally, proppants comprising the particle encapsulated with the curable polyurethane coating may be classified as curable proppants, subsurface-curable proppants and partially-curable proppants. Subsurface-curable proppants typically cure entirely in the subsurface reservoir, while partially-curable proppants are typically partially cured before being pumped into the subsurface reservoir. The partially-curable proppants then typically fully cure in the subsurface reservoir. The proppant of the subject disclosure can be either subsurface-curable or partially-curable.

Multiple layers of the polyurethane coating can be applied to the particle to form the proppant. As such, the proppant of the subject disclosure can include a particle having a cross-linked polyurethane coating disposed on the particle and a curable polyurethane coating disposed on the cross-linked coating, and vice versa. Likewise, multiple layers of the polyurethane coating, each individual layer having the same or different physical properties can be applied to the particle to form the proppant. In addition, the polyurethane coating can be applied to the particle in combination with coatings of different materials such as polyurethane coatings, polycarbodiimide coatings, polyamide imide coatings, polyisocyanurate coatings, polyoxizolidone coatings, polyacrylate coatings, epoxy coatings, furan coatings, sodium silicate coatings, hybrid coatings, and other material coatings.

The polyurethane coating typically exhibits excellent adhesion to inorganic substrates. That is, the polymer wets out and bonds with inorganic surfaces, such as the surface of a sand particle, which consists primarily of silicon dioxide. As such, when the particle of the proppant is a sand particle, the polyurethane coating bonds well with the particle to form a proppant which is especially strong and durable.

The proppant of the subject disclosure exhibits excellent thermal stability for high temperature and pressure applications. The polyurethane coating is typically stable at temperatures greater than about 200 (392), alternatively greater than about 210 (410), alternatively greater than about 220 (428), alternatively greater than about 230 (446), alternatively greater than about 240 (464), alternatively greater than about 250 (482), alternatively greater than about 260 (500), alternatively greater than about 270 (518), alternatively greater than about 280 (536), alternatively greater than about 290 (554), alternatively greater than about 300 (572), alternatively greater than about 310 (590), alternatively greater than about 320 (608), alternatively greater than about 330 (626), alternatively greater than about 340 (644), ° C. (° F.). The thermal stability of the polyurethane coating is typically determined by thermal gravimetric analysis (TGA). Specifically, the thermal stability of the polyurethane coating is measured on a TGA at a ramp of 10° C./min. The temperature at which a sample of polyurethane coating loses "10 weight %" is the temperature at which the polyurethane coating loses its thermal stability. Accordingly, the polyurethane is stable at temperatures below this "10 weight % loss" temperature, and thermally unstable at temperatures above this "10 weight % loss" temperature.

Further, the polyurethane coating does not degrade or delaminate from the particle at pressures (even at the temperatures described in the preceding paragraph) of greater than about 51.7 MPa (7,500 psi), alternatively greater than about 68.9 MPa (10,000 psi), alternatively greater than about 86.2 MPa (12,500 psi), alternatively greater than about 103.4 MPa (15,000 psi). Said differently, the proppant of this disclosure does not typically suffer from failure of the polyurethane coating due to shear or degradation when exposed to the temperatures and pressures set forth in the preceding two paragraphs.

Further, with the polyurethane coating of this disclosure, the proppant typically exhibits excellent crush strength, also commonly referred to as crush resistance. With this crush strength, the polyurethane coating of the proppant is uniform and is substantially free from defects, such as gaps or indentations, which often contribute to premature breakdown and/or failure of the polyurethane coating. In particular, the proppant typically exhibits a crush strength of 5 percent or less maximum fines as measured in accordance with American Petroleum Institute (API) RP60 or DIN EN ISO 13503-2 at pressures ranging from about 51.7 MPa (7,500 psi) to about 103.4 MPa (15,000 psi), including at specific stress pressures of about 51.7 MPa (7,500 psi), about 68.9 MPa (10,000 psi), about 86.2 MPa (12,500 psi), and about 103.4 MPa (15,000 psi).

When 40/70 white sand is utilized as the particle, a typical crush strength associated with the proppant of this disclosure is about 10 percent or less, alternatively about 5 percent, alternatively about 1 percent or less, maximum fines (less than 70 mesh) as measured in accordance with DIN EN ISO 13503-2, wherein a 40 g. proppant sample is tested in a test cylinder (having a diameter of 5 cm (2 in) as specified in DIN EN ISO 13503-2) with a 2 minute ramp rate and for 2 minutes at 55.2 MPa (8000 psi) and 23° C. (73° F.). As a comparison, uncoated 40/70 white sand typically has a crush strength of greater than 10 percent fines under the same conditions.

With respect to hydrolytic stability, when 40/70 white sand is utilized as the particle, a typical crush strength associated with the proppant of this disclosure, when tested after submersion in water for 30 days at 95° C. in 2% KCL, is still about 10 percent or less, alternatively about 5 percent or less, alternatively about 1.5 percent or less, alternatively about 1 percent or less, maximum fines (less than about 70 mesh) as measured in accordance with DIN EN ISO 13503-2, wherein a 40 g. proppant sample is tested in a test cylinder (having a diameter of 5 cm (2 in) as specified in DIN EN ISO 13503-2) with a 2 minute ramp rate and for 2 minutes at 55.2 MPa (8000 psi) and 23° C. (73° F.).

As a comparison, 40/70 white sand typically coated with polyurethane which is not in accordance with this disclosure, i.e., does not include the polydiene polyol, has a crush strength of greater than 10 percent fines under the same conditions.

The polyurethane coating of this disclosure typically provides a cushioning effect for the proppant and evenly distributes high pressures, e.g. closure stresses, around the proppant. Therefore, the proppant of the subject disclosure effectively props open fractures and minimizes unwanted impurities in unrefined petroleum fuels in the form of dust particles.

Although customizable according to carrier fluid selection, the proppant typically has a bulk specific gravity of from about 0.1 to 3.0, alternatively from about 1.0 to 2.0. One skilled in the art typically selects the specific gravity of the proppant according to the specific gravity of the carrier fluid and whether it is desired that the proppant be lightweight or substantially neutrally buoyant in the selected carrier fluid. Further, depending on the non-wettability of the polyurethane coating, the proppant of such an embodiment typically has an apparent density, i.e., a mass per unit volume of proppant of from about 2.0 to 3.0, alternatively from about 2.3 to 2.7, g/cm$^3$ according to API Recommended Practices RP60 (or DIN EN ISO 13503-2) for testing proppants. It is believed that the non-wettability of the polyurethane coating may contribute to flotation of the proppant depending on the selection of the carrier fluid in the wellbore.

Further, the proppant typically minimizes unpredictable consolidation. That is, the proppant only consolidates, if at all, in a predictable, desired manner according to carrier fluid selection and operating temperatures and pressures. Also, the proppant is typically compatible with low-viscosity carrier fluids having viscosities of less than about 3,000 cps at 80° C. (176° F.) and is typically substantially free from mechanical failure and/or chemical degradation when exposed to the carrier fluids and high pressures. Finally, the proppant is typically coated via economical coating processes and typically does not require multiple coating layers, and therefore minimizes production costs.

As set forth above, the subject disclosure also provides the method of forming, or preparing, the proppant. The method of forming the proppant includes the steps of combining the isocyanate component and the isocyanate-reactive component to form a reaction mixture, and coating the particle with the reaction mixture to form the proppant comprising the particle and the polyurethane coating disposed there about.

For this method, the isocyanate component and the isocyanate-reactive component are typically provided. As with all other components which may be used in the method of the subject disclosure (e.g. the particle), the isocyanate component and the isocyanate-reactive component are just as described above.

The isocyanate-reactive component is not required to be formed prior to exposure of the particle to the individual components. That is, the isocyanate component and the isocyanate-reactive component may be combined to form the reaction mixture simultaneous with the coating of the particle the with the reaction mixture. Alternatively, as is indicated in certain embodiments below, the isocyanate component and the isocyanate-reactive component may be combined prior to the coating of the particle. The steps of combining and coating are conducted, either sequentially or simultaneously at a temperature of from about −10 to 50, alternatively from about 0 to 35, ° C.

In this method, the steps of combining and coating the particle are typically collectively conducted in about 20 minutes or less, alternatively in about 10 minutes or less, alternatively in about 1 to 20 minutes, alternatively in about 1 to 10 minutes, alternatively from about 1 to 3 minutes.

Prior to the step of coating, the particle may optionally be heated to a temperature greater than about 50° C. (122° F.) prior to or simultaneous with the step of coating the particle. If heated, a preferred temperature range for heating the particle is typically from about 50 (122° F.) to 220° C. (428° F.). The particle may also optionally be pre-treated with a silicon-containing adhesion promoter prior to the step of coating the particle.

Various techniques can be used to coat the particle. These techniques include, but are not limited to, mixing, pan coating, fluidized-bed coating, co-extrusion, spraying, in-situ formation of the polyurethane coating, and spinning disk encapsulation. The technique for applying the polyurethane coating to the particle is selected according to cost, production efficiencies, and batch size.

In one embodiment, the isocyanate-reactive component is disposed on the particle via mixing in a vessel, e.g. a reactor. In particular, the individual components of the proppant are added to the vessel to form a reaction mixture. The components may be added in equal or unequal weight ratios. The reaction mixture is typically agitated at an agitator speed commensurate with the viscosities of the components. Further, the reaction mixture is typically heated at a temperature commensurate with the polyurethane coating technology and batch size. It is to be appreciated that the technique of mixing may include adding components to the vessel sequentially or concurrently. Also, the components may be added to the vessel at various time intervals and/or temperatures.

In another embodiment, the polyurethane coating is disposed on the particle via spraying. In particular, individual components of the polyurethane coating are contacted in a spray device to form a coating mixture. The coating mixture is then sprayed onto the particle to form the proppant. Spraying the polyurethane coating onto the particle typically results in a uniform, complete, and defect-free polyurethane coating disposed on the particle. For example, the polyurethane coating is typically even and unbroken. The polyurethane coating also typically has adequate thickness and acceptable integrity, which allows for applications requiring controlled-release of the proppant in the fracture. Spraying also typically results in a thinner and more consistent polyurethane coating disposed on the particle as compared to other techniques, and thus the proppant is coated economically. Spraying the particle even permits a continuous manufacturing process. Spray temperature is typically selected by one known in the art according to polyurethane coating technology and ambient humidity conditions. Further, one skilled in the art typically sprays the components of the polyurethane coating at a viscosity commensurate with the viscosity of the components.

In a preferred embodiment, the polyurethane coating is disposed on the particle in-situ, i.e., in a reaction mixture comprising the components of the polyurethane coating and the particle. In this embodiment, the polyurethane coating is formed or partially formed as the polyurethane coating is disposed on the particle. In-situ polyurethane coating formation steps typically include providing each component of the polyurethane coating, providing the particle, combining the components of the polyurethane coating and the particle, and disposing the polyurethane coating on the particle. In-situ formation of the polyurethane coating typically allows for reduced production costs by way of fewer processing steps as compared to existing methods for forming a proppant.

The formed proppant is typically prepared according to the method as set forth above and stored in an offsite location before being pumped into the subterranean formation and the subsurface reservoir. As such, coating typically occurs offsite from the subterranean formation and subsurface reservoir. However, it is to be appreciated that the proppant may also be prepared just prior to being pumped into the subterranean formation and the subsurface reservoir. In this scenario, the proppant may be prepared with a portable coating apparatus at an onsite location of the subterranean formation and subsurface reservoir.

The proppant is useful for hydraulic fracturing of the subterranean formation to enhance recovery of petroleum and the like. In a typical hydraulic fracturing operation, a hydraulic fracturing composition comprising the carrier fluid, the proppant, and optionally various other components, is prepared. The carrier fluid is selected according to wellbore conditions and is mixed with the proppant to form the mixture which is the hydraulic fracturing composition. The carrier fluid can be a wide variety of fluids including, but not limited to, kerosene and water. Typically, the carrier fluid is water. That is, in one particular embodiment, the hydraulic fracturing composition comprises water and the proppant as described above. Various other components which can be added to the hydraulic fracturing composition include, but are not limited to, guar, polysaccharides, and other components know to those skilled in the art.

The hydraulic fracturing composition is pumped into the subsurface reservoir, which may be the wellbore, to cause the subterranean formation to fracture. More specifically, hydraulic pressure is applied to introduce the hydraulic fracturing composition under pressure into the subsurface reservoir to create or enlarge fractures in the subterranean formation. When the hydraulic pressure is released, the proppant holds the fractures open, thereby enhancing the ability of the fractures to extract petroleum fuels or other subsurface fluids from the subsurface reservoir to the wellbore.

The following examples are meant to illustrate the disclosure and are not to be viewed in any way as limiting to the scope of the disclosure.

EXAMPLES

Examples 1-9 are proppants according to the subject disclosure which are formed with the components listed in Table 1 below. The amounts in Table 1 are in grams, unless otherwise specified.

To form Examples 1-9, The Polydiene Polyol and the Chain Extender are pre-mixed to form an isocyanate-reactive component. The Particle is then added to a Hobart mixer. The Isocyanate Component is then added to the Hobart mixer and mixed for 2 minutes. The Isocyanate-reactive Component is then added to the Hobart mixer and mixed for 2 additional minutes to form Proppants 1-9.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Isocyanate Component (grams) | | | | | | | | | |
| Isocyanate | 3.14 | 4.43 | 5.31 | 2.35 | 3.31 | 4.05 | 1.99 | 2.72 | 3.34 |
| Isocyanate-Reactive Component (grams) | | | | | | | | | |
| Polydiene Polyol | 6.17 | 4.46 | 3.28 | 6.88 | 5.35 | 4.16 | 7.21 | 5.82 | 4.66 |
| Chain Extender A | 0.69 | 1.11 | 1.41 | — | — | — | — | — | — |
| Chain Extender B | — | — | — | 0.76 | 1.34 | 1.78 | — | — | — |
| Chain Extender C | — | — | — | — | — | — | 0.80 | 1.46 | 2.00 |
| Total | 10 | 10 | 10 | 10 | 10 | 10 | 10 | 10 | 10 |
| Proppant (percent by weight based on the total weight proppant) | | | | | | | | | |
| Coating | 2.9 | 2.9 | 2.9 | 2.9 | 2.9 | 2.9 | 2.9 | 2.9 | 2.9 |
| Particle | 97.1 | 97.1 | 97.1 | 97.1 | 97.1 | 97.1 | 97.1 | 97.1 | 97.1 |
| Total | 100 | 100 | 100 | 100 | 100 | 100 | 100 | 100 | 100 |
| Physical Properties | | | | | | | | | |
| TGA 10% Wt. Loss (° C.) | — | — | 263 | — | — | 330 | — | — | 340 |

Isocyanate Component comprises polymeric diphenylmethane diisocyanate and 4,4'-diphenylmethane diisocyanate, and has an NCO content of about 33.5 weight percent.

Polydiene Polyol is a hydroxyl-terminated polybutadiene having about 65 percent by weight 1,2-vinyl units, a molecular weight of about 2000 g/mol, and a viscosity of about 20 Pa·sec.

Chain Extender A is propylene glycol.
Chain Extender B is dipropylene glycol.
Chain Extender C is tripropylene glycol.
Particle A is white sand having a sieve size of 40/70 (US Sieve No.) or 0.422/0.211 (mm).

Examples 3 and 9 as well as Comparative Examples 1 and 2 are tested for crush resistance. The appropriate formula for determining percent fines is set forth in DIN EN ISO 13503-2. The crush resistance is tested by compressing a proppant sample, which weighs 40 grams, in a test cylinder (having a diameter of 5 cm (2 in) as specified in DIN EN ISO 13503-2) with a 2 minute ramp rate and for 2 minutes at 55.2 MPa (8000 psi) and 23° C. (73° F.). The test data is set forth in Tables 2 and 3 below.

TABLE 2

| | Ex. 3 | Ex. 9 | C. Ex. 1 | C. Ex. 2 |
|---|---|---|---|---|
| Crush Strength (% Fines <70 sieve) | 0.9 | 0.9 | 11.1 | 1.1 |

Comparative Example 1 is uncoated white sand having a sieve size of 40/70 (US Sieve No.) or 0.422/0.211 (mm).

Comparative Example 2 is white sand having a sieve size of 40/70 (US Sieve No.) or 0.422/0.211 (mm) coated with 3.4 percent by weight, based on the total weight of proppant, polycarbodiimide coating.

Referring now to Table 2, the proppant of Examples 3 and 9 demonstrates excellent thermal stability and crush resistance. In particular, the initial crush resistance of Examples 3 and 9 is superior to that of uncoated sand, and is also superior to that of a proppant comprising particle and a polycarbodiimide coating disposed thereon.

TABLE 3

| | Ex. 3 | Ex. 9 |
|---|---|---|
| Crush Strength (% Fines <70 sieve) | 0.9 | 0.9 |
| Crush Strength (% Fines <70 sieve) submersion in water for 30 days at 95° C. in 2% KCL | 1.3 | 1.0 |

Referring now to Table 3, the hydrolytic stability of Examples 3 and 9 is excellent. That is, after 30 days of aging in water at 95° C. in 2% KCL the percent fines of Examples 3 and 9 increases an average of 0.25% or, as a percentage of the percent fines originally generated before aging, increases on average about 28% by weight. Further, an argument can even be made that the results in Table 3 are within standard test variation (+/−0.5%), and that there is no statistical difference in the crush strength of Examples 3 and 9 before and after submersion in water.

Importantly, the crush resistance upon exposure to water of Examples 3 and 9 is superior to that of a proppant having a polyurethane coating which is not formed from a polydiene polyol. For example, a comparative proppant comprising a white sand particle coated with 3 percent by weight of a comparative polyurethane coating based on the total weight proppant (which is formed from the Isocyanate Component (11.46 g) described above and diethylene glycol (4.33 g) and does not include the polybutadiene polyol) exhibits an 87% by weight increase in percentage of percent fines over the original percent fines generated before aging when tested for crush resistance. That is, a comparative polyurethane coating produces almost twice as much percent fines when tested for crush resistance after exposure to water, while the polyurethane coating of the subject invention, formed from a polybutadiene polyol, produces only about 28% more fines when tested for crush resistance after exposure to water.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A proppant for hydraulically fracturing a subterranean formation, said proppant comprising:
   A. a particle present in an amount of from 96 to 99 percent by weight based on the total weight of said proppant; and
   B. a polyurethane coating disposed about said particle and present in an amount of from 1.0 to 4.0 percent by weight based on the total weight of said proppant, said polyurethane coating comprising the reaction product of:
      an isocyanate component present in an amount of from 19.9% to 53.1% by weight based on the total weight of all components included in the isocyanate component, and
      an isocyanate-reactive component comprising 70% to 90% of a polybutadiene and 10% to 30% of a chain extender, based on the total weight of all components included in the isocyanate-reactive component,
      wherein the isocyanate component is selected from the group consisting of diphenylmethane diisocyanates (MDIs), polymeric diphenylmethane diisocyanates (pMDIs), toluene diisocyanates (TDIs), hexamethylene diisocyanates (HDIs), isophorone diisocyanates (IP-DIs), and combinations thereof,
      wherein said chain extender comprises an alkylene glycol selected from the group consisting of propylene glycol, dipropylene glycol, tripropylene glycol, and combinations thereof, and
      wherein said polybutadiene comprises no less than 50 percent by weight 1,2-vinyl units based the total weight of said polybutadiene.

2. The proppant as claimed in claim 1, wherein said polybutadiene is a hydroxyl-terminated polybutadiene.

3. The proppant as claimed in claim 1, wherein said isocyanate component comprises polymeric diphenylmethane diisocyanate and 4,4'-diphenylmethane diisocyanate, and has an NCO content of about 33.5 weight percent.

4. The proppant as claimed in claim 1, wherein said particle is selected from the group consisting of minerals, ceramics, sands, nut shells, gravels, mine tailings, coal ashes, rocks, smelter slag, diatomaceous earth, crushed charcoals, micas, sawdust, wood chips, resinous particles, polymeric particles, and combinations thereof.

5. The proppant as claimed in claim 1, that is thermally stable at temperatures greater than 200° C.

6. A hydraulic fracturing composition comprising water and the proppant as claimed in claim 1.

7. A method of forming the proppant as claimed in claim 1, said method comprising the steps of:
   A. combining the isocyanate component and the isocyanate-reactive component to form a reaction mixture; and
   B. coating the particle with the reaction mixture to form the proppant comprising the particle and the polyurethane coating disposed about said particle.

8. The method as claimed in claim 7, wherein the step of combining is conducted simultaneous with the step of coating.

9. The method as claimed in claim 7, wherein the steps of combining and coating are conducted at a temperature of from −10 to 50° C.

10. The method as claimed in claim 7, wherein the steps of combining and coating are collectively conducted in 10 minutes or less.

* * * * *